United States Patent
Ennis et al.

(10) Patent No.: US 7,838,601 B2
(45) Date of Patent: *Nov. 23, 2010

(54) PARTIALLY NEUTRALIZED CHLOROSULFONATED POLYOLEFIN ELASTOMERS

(75) Inventors: Royce Elton Ennis, Silsbee, TX (US); Avinash C. Gadkari, Pearland, TX (US); Furman Eugene Glenn, Louisville, KY (US)

(73) Assignee: DuPont Performance Elastomers L.L.C., Wilmington, DE (US)

( * ) Notice: Subject to any disclaimer, the term of this patent is extended or adjusted under 35 U.S.C. 154(b) by 331 days.

This patent is subject to a terminal disclaimer.

(21) Appl. No.: 12/075,769

(22) Filed: Mar. 13, 2008

(65) Prior Publication Data

US 2008/0249243 A1    Oct. 9, 2008

Related U.S. Application Data

(60) Provisional application No. 60/921,582, filed on Apr. 3, 2007.

(51) Int. Cl.
*C08C 19/12* (2006.01)
*C08C 19/14* (2006.01)
*C08C 19/20* (2006.01)
*C08F 210/16* (2006.01)
*C08F 236/02* (2006.01)

(52) U.S. Cl. ............... 525/331.8; 525/331.7; 525/332.8; 525/333.9; 525/334.1; 525/343; 525/344; 525/355; 525/356; 525/359.1

(58) Field of Classification Search ............. 525/331.7, 525/331.8, 332.8, 333.9, 334.1, 343, 344, 525/355, 356, 359.1

See application file for complete search history.

(56) References Cited

U.S. PATENT DOCUMENTS

| 3,607,979 | A | | 9/1971 | Winkler |
| 5,668,220 | A | | 9/1997 | Effler, Jr. et al. |
| 7,550,539 | B2 | * | 6/2009 | Ennis et al. ............... 525/333.9 |

FOREIGN PATENT DOCUMENTS

| EP | 131 948 | * | 1/1985 |
| EP | 0131948 A2 | | 1/1985 |
| EP | 0461842 A | | 12/1991 |
| GB | 861542 A | | 2/1961 |
| GB | 1246545 | * | 9/1971 |
| GB | 1246545 A | | 9/1971 |
| GB | 1265354 A | | 3/1972 |
| JP | HEI21990-18681 | | 4/1990 |

OTHER PUBLICATIONS

U.S. Appl. No. 12/075,647, filed Oct. 9, 2008, Ennis et al.
U.S. Appl. No. 12/075,525, filed Oct. 9, 2008, Gadkari.
U.S. Appl. No. 12/075,770, filed Oct. 9, 2008, Ennis.
U.S. Appl. No. 12/075,768, filed Oct. 9, 2008, Ennis et al.

* cited by examiner

*Primary Examiner*—Roberto Rabago
(74) *Attorney, Agent, or Firm*—George E. Kirvan, Jr.

(57) ABSTRACT

Partially neutralized chlorosulfonated polyolefin elastomers containing 0.5-10 weight percent chlorine and 0.25 to 5 weight percent sulfur are prepared from polyolefin elastomer base resins selected from the group consisting of propylene/ethylene copolymers, ethylene/propylene/diene copolymers, isobutylene/diene copolymers, isobutylene homopolymers, hydrogenated styrene/butadiene block copolymers and hydrogenated styrene/isoprene block copolymers.

4 Claims, No Drawings

PARTIALLY NEUTRALIZED CHLOROSULFONATED POLYOLEFIN ELASTOMERS

CROSS-REFERENCE TO RELATED APPLICATIONS

This application claims the benefit of U.S. Provisional Application No. 60/921,582 filed Apr. 3, 2007.

FIELD OF THE INVENTION

This invention relates to at least partially neutralized chlorosulfonated polyolefin elastomers, more particularly to chlorosulfonated polyolefin elastomers having a plurality of —$SO_3M$ groups, wherein M is a cation.

BACKGROUND OF THE INVENTION

Chlorosulfonated polyethylene elastomers and chlorosulfonated ethylene copolymer elastomers have been found to be very good elastomeric materials for use in applications such as wire and cable jacketing, molded goods, automotive hose, power transmission belts, roofing membranes and tank liners. These materials are noted for their balance of oil resistance, thermal stability, ozone resistance and chemical resistance.

Historically, a wide variety of polyolefin polymers, including ethylene homopolymers and copolymers, have been utilized as the starting polymers (i.e. "base polymers" or "base resins") for manufacture of chlorosulfonated products. The majority of base polymers employed in the manufacture of chlorosulfonated elastomers have been polyethylene types, e.g. low density polyethylene (LDPE), linear low density polyethylene (LLDPE) and high density polyethylene (HDPE). Most of the ethylene homopolymers and copolymers employed to make these elastomers are polymerized by a high pressure free radical catalyzed process or by a low pressure process using Ziegler-Natta or Phillips type catalysts.

U.S. Pat. No. 5,668,220 discloses chlorinated and chlorosulfonated elastomers that contain 20-50 weight percent chlorine and 0.8-2.5 weight percent sulfur. These elastomers are made from ethylene/alpha-olefin copolymers that were polymerized in the presence of a single site or metallocene catalyst. Such ethylene copolymers have improved extrusion or flow properties when compared to polymers having the same molecular weight distribution, but produced using a Ziegler-Natta catalyst.

Japanese Kokai Hei 2[1990]-18681 discloses polyolefin ionomers containing —$SO_3M$ groups, where M is a univalent cation. The ionomers are made by reacting a portion of the —$SO_2Cl$ groups on a chlorosulfonated polyolefin with base. Chlorosulfonated polyethylene is described as having between 25-36% chlorine. However, ionomers made from chlorosulfonated ethylene/alpha-olefins of the type taught in U.S. Pat. No. 5,688,220 are not disclosed.

Ethylene based elastomers (e.g. EP and EPDM) are utilized as viscosity modifiers for oils in automotive and industrial applications. These polymers are readily soluble and stable in paraffinic and naphthenic oils whereas more polar polymers (e.g. ethylene acrylic or methacrylic copolymers and highly chlorinated ethylene polymers) are not.

Isobutylene based elastomers (e.g. PIB and isobutylene/diene copolymers) have traditionally been used as modifying agents for motor oils and greases to enhance their utility at higher temperatures.

Styrene based elastomers (e.g. SBS and SIS block copolymers and preferably their hydrogenated derivatives) have also shown application as viscosity modifiers in oil formulations and adhesives applications.

Propylene based polymers (e.g. atactic polypropylene and propylene/ethylene copolymers) have been utilized as adhesives and bonding agents as well as viscosity modifiers in industrial applications.

Many of these polymers are functionalized with reactive groups in order to incorporate stabilizers for oil-based formulations, resulting in enhanced stability and prevention of deposit formation in equipment.

It would be desirable to have partially neutralized (i.e. ionomers) of elastomeric polymers having less than 20 weight percent chlorine and a low level of residual crystallinity for use in oil based solutions and emulsions. In some of these applications where solution viscosity must be balanced with oil solubility, polymer thermal stability and detergency, it would be desirable to employ a mixture of copolymers.

SUMMARY OF THE INVENTION

An aspect of the present invention is a chlorosulfonated polyolefin elastomer composition comprising at least one chlorosulfonated polyolefin elastomer having 0.5 to 10 weight percent chlorine and 0.25 to 5 weight percent sulfur, based on the total weight of said chlorosulfonated polyolefin elastomer, and a plurality of —$SO_3M$ groups, wherein M is a cation, and wherein each of said chlorosulfonated polyolefin elastomers present in said chlorosulfonated polyolefin elastomer composition is produced from a different polyolefin copolymer, said polyolefin copolymers being selected from the group consisting of propylene/ethylene copolymers, ethylene/propylene/diene copolymers, isobutylene/diene copolymers, isobutylene homopolymers, hydrogenated styrene/butadiene block copolymers and hydrogenated styrene/isoprene block copolymers.

DETAILED DESCRIPTION OF THE INVENTION

The at least partially neutralized chlorosulfonated polyolefin elastomers of the invention are made by neutralizing with base a portion of the pendant —$SO_2Cl$ groups on certain chlorosulfonated polyolefin elastomers (described hereinafter). Typically only about 10 to 90% (as evidenced by FTIR measurements or titration analysis) of the —$SO_2Cl$ groups react with base to form a plurality of —$SO_3M$ groups, so that the elastomers are termed "partially neutralized". However, fully neutralized elastomers are also considered part of this invention.

In the neutralization process, at least one chlorosulfonated polyolefin elastomer is first dissolved in a solvent such as carbon tetrachloride, tetrachloroethylene, xylene or mineral oil at about 40° C. Optionally, rather than starting with a solid chlorosulfonated polymer that must be dissolved, a solution of at least one chlorosulfonated polymer from the chlorosulfonation process described hereinafter (after degassing) can be utilized. A quantity of demineralized water is added to the solution. Next, an aqueous solution of a base, e.g. sodium hydroxide, is added to the copolymer solution and the resulting liquid mixed at high shear rate for the desired time. The amount of base added is typically between 0.5 and 2.5 molar equivalents of base per equivalent of —$SO_2Cl$ groups on the copolymer. Optionally, the base is added in the form of an emulsion comprising demineralized water, base, and compatibilizer (e.g. an ionic or non-ionic surfactant (such as sodium lauryl sulfate, Triton® X-100, etc.), sodium stearate, a metal rosin soap, or a quaternary ammonium salt) and a solvent (e.g. carbon tetrachloride, tetrachloroethylene or xylene). The resulting polymer may be isolated by a variety of techniques such as precipitation by addition of a non-solvent (e.g. methanol or isopropanol) and then drying recovered polymer in a vacuum oven, or by steam stripping the solution to remove solvent and then drying recovered polymer in a vacuum oven. A preferred isolation process is drum drying where the polymer solution is contacted with a heated drum that flashes the solvent, depositing the polymer as a thin film that is removed to recover the polymer.

The resulting at least partially neutralized chlorosulfonated polyolefin elastomer contains a plurality of —$SO_3M$ groups where M is a cation. The cation, M, originates with the base employed in the neutralization reaction and may be univalent or multivalent. M is preferably sodium or potassium ion. Examples of bases that may be utilized in the neutralization reaction include, but are not limited to sodium hydroxide, sodium carbonate, potassium hydroxide, lithium hydroxide, magnesium hydroxide, calcium hydroxide, aluminum hydroxide, a sodium salt of a fatty acid and tertiary amines such as alkyl tertiary amines and various ethoxylated tertiary amines. A combination of inorganic and organic bases may be used.

The chlorosulfonated polyolefin elastomers employed in this invention contain between 0.5 and 10 (preferably between 0.75 and 8, most preferably between 1 and 6) weight percent chlorine and between 0.25 and 5 (preferably between 0.35 and 3, most preferable between 0.5 and 2) weight percent sulfur. These elastomers may be made in a solution process (meaning that the base polymer is dissolved in a solvent) by either reaction with $Cl_2$ and $SO_2$ or reaction with sulfuryl chloride ($SO_2Cl_2$).

In the $Cl_2/SO_2$ chlorosulfonation process, a solvent mixture of carbon tetrachloride and chloroform is introduced to a reactor having a condenser and pressure control. Next, a quantity of at least one polyolefin elastomer base resin is added to the reactor. Optionally, more than one base resin may be added to the reactor so as to result in a blend of chlorosulfonated polyolefin elastomers. If desired, any moisture present in the reactor may be removed by addition of a small amount of a chemical scavenger (e.g. thionyl chloride or acetyl chloride). Optionally, moisture can be removed by pulling a vacuum on the reactor to flash a small amount of solvent, which contains the lower boiling water/solvent azeotrope. An azo initiator (e.g. Vazo® 52 available from DuPont) is introduced and the reactor purged with nitrogen to remove oxygen. The reactor is heated to about 85° C. to quickly dissolve all of the base resin. After reducing the temperature to 55°-60° C., chlorine gas, sulfur dioxide and additional initiator is introduced to the reactor. When a desired level of chlorosulfonation has occurred, the reaction mass is degassed with nitrogen, followed by application of a vacuum. Optionally, an epoxide, e.g. Epon® 828 (available from Hexion Specialty Chemicals), is added to stabilize the product. Also optionally, an antioxidant, e.g. Irganox® 1010 (available from Ciba Specialty Chemicals) is added to protect the polymer during storage. The resulting chlorosulfonated polyolefin elastomer solution can be stored or used directly in the above-described neutralization process. Optionally, the chlorosulfonated polyolefin elastomer may be isolated from solvent prior to use in the neutralization process.

The $SO_2Cl_2$ chlorosulfonation process differs from the $Cl_2/SO_2$ process in that sulfuryl chloride and an optional amine activator (e.g. pyridine, 1,8-diazabicyclo [5.4.0] undec-7-ene (DBU), etc.), rather than chlorine gas/sulfur dioxide mixture, is employed to chlorosulfonate the base resin.

The polyolefin elastomers employed as base resins to make the at least partially neutralized chlorosulfonated polyolefins of the invention are selected from the group consisting of propylene/ethylene copolymers, ethylene/propylene/diene copolymers, isobutylene/diene copolymers, isobutylene homopolymers, hydrogenated styrene/butadiene block copolymers and hydrogenated styrene/isoprene block copolymers. These copolymers may be semi-crystalline or amorphous.

Specific commercially available examples of these polyolefin elastomers include, but are not limited to Versify® Plastomer and Elastomers (propylene/ethylene copolymers) and Nordel® EPDM (ethylene/propylene/diene copolymers), both available from The Dow Chemical Company; Vistamaxx® specialty elastomers(propylene/ethylene copolymers), Vistalon® EPDM (ethylene/propylene/diene copolymers), Exxon Butyl® (isobutylene/diene copolymers) and Vistanex® PIB (isobutylene homopolymers), available from ExxonMobil; and Kraton® G SEBS (hydrogenated styrene/butadiene block copolymers) & SEPS (hydrogenated styrene/isoprene block copolymers) from The Kraton company.

The at least partially neutralized chlorosulfonated polyolefin elastomers of this invention have a variety of end uses such as viscosity modifiers, adhesives, compatibilizers, cured and uncured elastomeric systems, impact modifiers and organosol components.

Compounds of the partially neutralized chlorosulfonated polyolefin elastomers of the invention may be formulated to contain curatives and other additives typically employed in traditional chlorosulfonated polyolefin compounds.

Useful curatives include bismaleimide, peroxides (e.g. Di-Cup®), sulfur donors (e.g. dithiocarbamyl polysufides) and metal oxides (e.g. MgO).

Examples of additives suitable for use in the compounds include, but are not limited to i) fillers; ii) plasticizers; iii) process aids; iv) acid acceptors; v) antioxidants and vi) antiozonants.

EXAMPLES

Test Methods

Weight percent Cl and S incorporated in chlorosulfonated polyolefin elastomers was measured by the Schoniger combustion method (J. C. Torr and G. J. Kallos, *American Industrial Association J.* July, 419 (1974) and A. M. MacDonald, *Analyst*, v86, 1018 (1961)).

The percent of —$SO_2Cl$ groups converted to —$SO_3M$ groups was estimated by utilizing Infrared Spectroscopy and examining the absorption regions for the —$SO_2Cl$ and —$SO_3M$ groups.

Example 1

A chlorosulfonated ethylene/propylene/ethylidene norbornene terpolymer was prepared by the chlorine gas/$SO_2$ procedure. 40 pounds (18.2 kg) of a solvent consisting of 90 weight percent (wt. %) carbon tetrachloride and 10 wt. % chloroform was added to a 10-gallon (37.9 liter), jacketed reaction vessel fitted with a condenser and pressure control. 2.0 pounds (0.91 kg) of ethylene/propylene/ethylidene norbornene (Nordel 4725P, available from The Dow Chemical Co., having a Mooney viscosity (ML 1+4@125° C.) of 25 and a density of 0.88 g/cm³) was then added to the reactor. The reactor was closed and sparged with nitrogen at about 10 liters/minute for 20 minutes to remove air. The reaction mass was sparged with sulfur dioxide and then pressured to 2 psig (13.8 kPa) with sulfur dioxide and increased to 10 psig (69 kPa) with nitrogen. The reactor content was then heated, with steam on the reactor jacket, to 85° C. for 30 minutes to dissolve the polymer. The reaction temperature was then lowered to 65° C. using a steam water mixture through the reactor jacket. While maintaining the reaction temperature at 65° C., a 0.7 wt. % solution Vazo® 52 initiator (available from DuPont) in chloroform was added continuously at a rate of 200 ml per hour for 10 minutes prior to start of gaseous chlorine addition and throughout the reaction. Chlorine gas was then sparged into the reactor at a rate of 0.05 lbs/hour (22.7 g/hour) and sulfur dioxide was added at a rate of 1 lb/hour (0.45 kg/hour) until 0.1 lbs (45 grams) of chlorine and 2.6 lbs (1.2 kg) of sulfur dioxide had been added, maintaining a reaction temperature of 65° C. throughout. A sample of reactor solution was taken for analysis. The product contained 0.98 wt. % sulfur and 2.98 wt. % chlorine. The reaction mass was degassed by heating the reactor contents under 20 psig (138 kPa) pressure to 90° C. and then reducing the reactor pressure to atmospheric. The reaction was stabilized by addition of 8.5 grams of Epon® 828 (a condensation product of epichlorohydrin and bisphenol A, available from Hexion Specialty Chemicals) and 0.9 grams of Irganox® 1010 (available from Ciba Specialty Chemicals). The chlorosulfonated ethylene/propylene/ethylidene norbornene terpolymer was isolated by slowly pouring the solution onto a heated drum dryer where the solvent was flashed off leaving a thin film of polymer, which was removed from the drum using a doctor blade.

100 grams of the chlorosulfonated ethylene/propylene/ethylidene norbornene terpolymer prepared above, containing 0.98 wt. % combined sulfur and 2.98 wt. % combined chlorine, was dissolved in 1 liter of a solvent consisting of 90 wt. % carbon tetrachloride and 10 wt. % chloroform in a stirred, electrically jacketed reactor fitted with a water cooled condenser. The solution was heated with stirring to reflux (about 72° C.) and the reaction mass was maintained at 72° C. throughout the reaction period. 70 ml of 2-propanol was then added to the reactor. 5.25 grams of a 50 wt. % aqueous solution of sodium hydroxide was added over a period of 10 minutes. Vigorous reflux initiated, which subsided in 5-6 minutes, indicating that the hydrolysis and neutralization was completed. The reaction mass became very viscous and viscosity was reduced by addition of 10 ml of water. A sample of the solution was isolated by evaporation, pressed into a film and analyzed by FTIR. Compared to the un-neutralized polymer a new strong peak at 1051 cm$^{-1}$ indicated the formation of the sodium sulfonate salt. Additional evidence included a shift of the —SO$_2$Cl peak at 1161 cm$^{-1}$ to 1172 cm$^{-1}$. The polymer was isolated from the solution by pouring slowly onto a steam heated drum dryer where the solvent was flashed off leaving a thin film that was removed from the drum using a doctor knife.

Example 2

A chlorosulfonated propylene/ethylene copolymer was prepared by the chlorine gas/SO$_2$ procedure. A 10 gallon (37.9 liter) autoclave jacketed reaction vessel fitted with a condenser and pressure control was charged with 40 pounds (18.2 kg) of a solvent consisting of 90 weight percent (wt. %) carbon tetrachloride and 10 wt. % chloroform. 3.0 pounds (1.36 kg) of a propylene/ethylene copolymer (Vistamaxx® 1100 available from ExxonMobil Chemical Corporation) having a MFR of 3 (ASTM D-1238, g/10 min.@230° C., 2.16 kg) and density of 0.860 g/cm$^3$ was then added to the reactor.

The polymer was dissolved in the solvent by raising the reactor temperature to 70° C. and holding at this temperature for 30 minutes under continuous agitation. The reactor temperature was then lowered to about 55° C. using a steam water mixture through the reactor jacket. While maintaining the reaction temperature at 57°-59° C., feed of a 0.7 wt. % solution Vazo® 52 initiator (available from DuPont) in chloroform was started and added continuously at a rate of 200 ml per hour. A low flow of sulfur dioxide gas was started into the reactor to raise the reactor pressure to about 2 psig (13.8 kPa). The reactor pressure was then raised to 20 psig (138 kPa) by a flow of nitrogen gas. Sulfur dioxide gas was continuously fed into the reactor at a rate of about 1 lb/hour (about 0.45 kg/hour). Approximately 10 minutes after the reactor pressure was raised to 20 psig (138 kPa), a very low flow of chlorine gas, about 0.1 lbs/hour, (about 0.045 kg/hour) was started to the reactor. The reaction was continued for about 95 minutes during which time small samples were taken from the reactor and analyzed by FTIR spectroscopy to monitor the chlorine and sulfur content of the chlorosulfonated polymer. When the desired level of chlorination and chlorosulfonation had occurred, all flows were stopped and the reactor was depressurized to atmospheric pressure to degas the solution. To stabilize the resulting polymer, 10 g of stabilizer, Epon® 828 (a condensation product of epichlorohydrin and bisphenol A, available from Hexion Specialty Chemicals), was dissolved in carbon tetrachloride and added to the reactor. The reaction solution was discharged from the reactor, filtered and collected in a bucket containing 1 g of Irganox® 1010 stabilizer. The chlorosulfonated polymer was isolated by evaporating the solvent on a drum dryer with steam heated drums leaving a thin polymer film, which was removed from the drum with a doctor blade. Schoniger elemental analysis was performed on the dried polymer to determine that it contained 1.2 wt. % chlorine and 0.45 wt. % sulfur. The presence of sulfonyl chloride groups [—SO$_2$Cl] in the chlorosulfonated polymer was also detected by a characteristic broad but intense peak in FTIR spectrum in the region 1160-1170 cm$^{-1}$.

50 grams of the chlorosulfonated propylene/ethylene copolymer prepared above was dissolved in 600 g of a solvent consisting of 90 wt. % carbon tetrachloride and 10 wt. % chloroform. 36.7 g of demineralized water was added and the components were mixed for 5 minutes with a Silverson L4R mixer at high speed and at 25° C. To this mixture was added 75 g of an aqueous emulsion containing 83 wt. % water, 1.6 wt. % sodium hydroxide 4.6 wt. % sodium lauryl sulfate (Dupanol from DuPont) and 9.1 wt. % carbon tetrachloride. The mixture was stirred at high speed for one hour using a Silverson L4R homomixer. The polymer was isolated from the emulsion by drum drying. FTIR analysis showed a new peak at 1051 cm$^{-1}$ when compared to the starting polymer, indicating formation of a sodium sulfonate.

Example 3

A chlorosulfonated butyl polymer was prepared by the chlorine gas/SO$_2$ procedure. 40 pounds (18.2 kg) of a solvent consisting of 90 weight percent (wt. %) carbon tetrachloride and 10 wt. % chloroform was added to a 10-gallon (37.9 liter), jacketed reaction vessel fitted with a condenser and pressure control. 2 pounds (0.908 kg) of butyl rubber (Butyl 165 available from Exxon Chemical Co) having Mooney Viscosity (ML 1+4@125C) of 32 and density of 0.92 g/cm$^3$ was then added to the reactor. 10 ml (17 grams) of acetyl chloride was added to remove moisture from the reactor contents. 2 grams of Vazo® 52 initiator (2,2'-azobis(2,4-dimethylpentane nitrile), available from DuPont) dissolved in 10 ml of chloroform was then added to the reactor. The reactor was closed and sparged with nitrogen at about 10 liters/minute to remove air as the reaction was heated to 75° C., over a period of about 20 minutes. After 30 minutes at 75° C., the reactor temperature was lowered to 61° C. using a steam water mixture through the reactor jacket. While maintaining the reaction temperature at 60° C., a 0.7 wt. % solution of Vazo® 52 catalyst in chloroform was added continuously at a rate of 200 ml per hour and continued throughout the reaction. Sulfur dioxide gas was then sparged into the reactor until a reactor pressure of 5 psig (34.4 kPa) was reached. The reactor pressure was then increased to 20 psig (138 kPa) with nitrogen, while maintaining a reaction temperature of 55°-60° C. The chlorosulfonation reaction required 90 minutes during which chlorine gas was sparged into the reactor at a rate of 0.12 pounds/hour (54.5 g/hr) and sulfur dioxide was added at a rate of 1 lb/hr (0.454 kg/hr) until 0.18 lbs (82 g) of chlorine and 1.5 pounds (0.68 kg) of sulfur dioxide had been added, while maintaining a reaction temperature of 55°-60° C. A sample of the reaction solution was taken for analysis. The isolated product was found to contain 3.7 wt. % chlorine and 0.7 wt. % sulfur. The reaction mass was degassed by sparging with a flow of nitrogen at about 10 liters/minute for 5 minutes. Heating the reaction mass to 85° C. then reducing the pressure to atmospheric and the reaction temperature to 72° C. further degassed the reaction. The reaction product was then stabilized by addition of 10 grams of Epon® 828 (a condensation product of epichlorohydrin and bisphenol, available from Hexion Specialty Chemicals) and 0.9 grams of Irganox 1010 (available from Ciba Specialty Chemicals). The resulting solution was set aside for use in neutralization experiments.

To 2,000 g. of a 6.8 wt. % solution of the chlorosulfonated butyl rubber prepared above in 90/10 (by weight) carbon tetrachloride/chloroform, was added 110 grams of demineralized water. The components were mixed for 5 minutes at high speed in a Silverson L4R homogenizer at 25° C. To this mixture was added 250 grams of an emulsion consisting of 83.4 wt. % water, 4.6 wt. % sodium lauryl sulfate (Dupanol from DuPont), 9.1 wt. % carbon tetrachloride and 2.9 wt. % sodium hydroxide. The mixture was stirred at high speed for one hour using a Silverson L4R homomixer. The polymer was isolated from the emulsion by pouring the solution onto a steam-heated drum dryer where the solvent was flashed off and the polymer film was removed with the aid of a doctor knife. FTIR analysis showed a new peak at 1051 cm$^{-1}$ when compared to the starting polymer, indicating formation of a sodium sulfonate.

Example 4

Preparation of Chlorosulfonated Butyl Polymer:

A chlorosulfonated butyl polymer was prepared by the chlorine gas/SO$_2$ procedure described in Example 3 using butyl rubber (Butyl 165, available from Exxon Chemical Co, having Mooney viscosity (ML 1+4@125° C.) of 32 and density of 0.92 g/cm$^3$). The resulting chlorosulfonated butyl polymer was isolated by slowly pouring the solution onto a heated drum dryer where the solvent was flashed off leaving a thin film of polymer which was removed from the drum using a doctor blade. The resulting chlorosulfonated butyl polymer was determined to contain 3.4 wt. % chlorine and 0.96 wt. % sulfur.

Preparation of 20 wt. % Fatty Acid Salt Concentrate:

A fatty acid sodium salt concentrate was prepared by adding 150 g of Westvaco 1408 fatty acid (1480 is a tall oil derivative with an equivalent weight of 280 g/equiv. obtained from the Westvaco company ) to 750 g of water and then, while stirring, adding 40 grams of 50 wt. % aqueous sodium hydroxide. The solution was stirred for 1 hour at 50° C. to form a waxy material containing 20 wt. % fatty acid sodium salt and 80% water This material was set aside for further use.

Preparation of Fatty Acid Salt Emulsion:

A fatty acid salt emulsion was prepared by adding 5.5 g of the above 20 wt. % fatty acid concentrate to 10 ml of CCl$_4$ and 10 g of water with moderate stirring.

Preparation of Partially Neutralized Chlorosulfonated Butyl Polymer Concentrate:

An 8 wt. % solution of chlorosulfonated butyl polymer was prepared by adding 32 g of the above isolated chlorosulfonated butyl polymer in approximately 1 g pieces over a 5 minute period into a solvent mixture containing 36 g chloroform and 332 g of carbon tetrachloride in a 400 ml beaker while agitating with a Silverson Homomixer at 3,000 rpm. After all polymer pieces had been added, mixing was continued for 3 minutes and then the fatty acid emulsion prepared above was added to the solution and agitation was continued for 30 minutes. The resulting 7.5 wt. % thick concentrate was set aside for future use. A small sample of the concentrate was taken and the polymer was isolated and examined by Infrared spectroscopy. The FTIR spectrum showed peaks at 1052 cm$^{-1}$ and 1182 cm$^{-1}$ indicating conversion of the sulfonyl chloride group to a sodium sulfonate salt.

Dilution of Concentrate:

10 g of the above at least partially neutralized chlorosulfonated butyl polymer concentrate was added to 90 g of CCl$_4$/CHCl$_3$ solvent mixture (9.7 wt. % CHCl$_3$) over a 2 minute period while agitating with a Silverson Homomixer at 3,000 rpm. The resulting 0.75 wt. % solution was stable upon standing, fluid and easily pourable.

What is claimed is:

1. A chlorosulfonated polyolefin elastomer composition comprising at least one chlorosulfonated polyolefin elastomer having 0.5 to 10 weight percent chlorine and 0.25 to 5 weight percent sulfur, based on the total weight of said chlorosulfonated polyolefin elastomer, and a plurality of —SO$_3$M groups, wherein M is a cation, and wherein said chlorosulfonated polyolefin elastomer is produced from an ethylene/propylene/diene copolymer.

2. A chlorosulfonated polyolefin elastomer composition of claim 1 wherein M is a cation selected from the group consisting of sodium, lithium, potassium, ammonium, calcium, magnesium, and aluminum ions, and the cation of a tertiary amine.

3. A chlorosulfonated polyolefin elastomer composition of claim 1 wherein said weight percent chlorine is between 0.76 and 8 and wherein said weight percent sulfur is between 0.35 and 3.

4. A chlorosulfonated polyolefin elastomer composition of claim 3 wherein said weight percent chlorine is between 1 and 6 and wherein said weight percent sulfur is between 0.5 and 2.

* * * * *